(12) United States Patent
Zelek et al.

(10) Patent No.: US 6,910,475 B2
(45) Date of Patent: Jun. 28, 2005

(54) BARBECUE GRILL CART ASSEMBLY

(75) Inventors: Leonard George Zelek, Chicago, IL (US); Adrian A. Bruno, Rolling Meadows, IL (US); Mark Johnson, Cary, IL (US); Daniel S. Choi, Mundelein, IL (US)

(73) Assignee: Weber-Stephen Products, Co., Palatine, IL (US)

( * ) Notice: Subject to any disclaimer, the term of this patent is extended or adjusted under 35 U.S.C. 154(b) by 109 days.

(21) Appl. No.: 10/319,452

(22) Filed: Dec. 13, 2002

(65) Prior Publication Data

US 2004/0112361 A1 Jun. 17, 2004

(51) Int. Cl.[7] .................................................. F24B 3/00
(52) U.S. Cl. ................... 126/25 R; 126/9 R; 126/41 R; 280/645; 280/652
(58) Field of Search ............................. 126/25 R, 41 R, 126/304 A, 9 R, 9 B, 276, 30, 50; 99/449, 340; 280/641, 642, 645, 652

(56) References Cited

U.S. PATENT DOCUMENTS

| | | | |
|---|---|---|---|
| 2,484,239 A | 10/1949 | Moon et al. | |
| 2,541,528 A | 2/1951 | McAvoy | |
| 2,780,474 A | 2/1957 | Farah et al. | |
| 2,932,479 A | 4/1960 | Leach | |
| 3,111,337 A | 11/1963 | Kates | |
| 3,297,016 A | * 1/1967 | Rhodes ...................... | 126/25 A |
| 3,556,076 A | 1/1971 | Stewart | |
| 4,131,261 A | 12/1978 | Shy | |
| 4,728,118 A | * 3/1988 | Haas .......................... | 280/641 |
| 4,949,701 A | 8/1990 | Krosp et al. | |
| 5,033,448 A | 7/1991 | Sandweg | |
| 5,050,577 A | 9/1991 | Baynes et al. | |
| 5,065,734 A | 11/1991 | Elliott | |
| 5,179,932 A | 1/1993 | DeCarlo | |
| 5,572,983 A | * 11/1996 | Schlosser et al. ......... | 126/25 R |
| 5,947,007 A | 9/1999 | O'Grady et al. | |
| 6,205,912 B1 | 3/2001 | Chiu | |
| 6,257,229 B1 | 7/2001 | Stewart et al. | |
| 6,422,230 B1 | * 7/2002 | Stewart et al. ............ | 126/25 R |
| 6,422,231 B1 | 7/2002 | Hamilton et al. | |
| 6,439,222 B1 | 8/2002 | Dixon et al. | |
| 2002/0020405 A1 | 2/2002 | Coleman et al. | |

* cited by examiner

*Primary Examiner*—Jiping Lu
(74) *Attorney, Agent, or Firm*—Wallenstein Wagner & Rockey Ltd.

(57) ABSTRACT

The present invention provides a barbecue grill cart assembly comprising a barbecue grill assembly having a cooking chamber and a frame assembly. The grill cart assembly further comprises a cart assembly having a first leg assembly and a second leg assembly pivotally connected to an upper frame member. The cart assembly also has a lower frame member pivotally connected to the first leg assembly wherein the lower frame member has having a securing element. The cart assembly is movable between an erect arrangement and a collapsed arrangement. In the erect arrangement, the securing element engages a portion of the second leg assembly and the first and second leg assemblies are positioned transverse to the upper frame member. To move the cart assembly to the collapsed arrangement, the securing element is disengaged from the second leg assembly and inserted through the second leg assembly. In the collapsed arrangement, the first and second leg assemblies are positioned between the upper frame member and the lower frame member.

50 Claims, 8 Drawing Sheets

BARBECUE GRILL CART ASSEMBLY

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates to a barbecue grill cart assembly. More specifically, the present invention relates to a barbecue grill cart assembly having a barbecue grill assembly releasably mounted on collapsible cart assembly that allows for transport in either an erect position or a collapsed position.

BACKGROUND OF THE INVENTION

As the popularity of barbecue grills have grown, grill manufacturers have sought to introduce new grill products to sustain consumer interest. Recently, manufacturers have introduced compact barbecue grills. Compact grills can employ either a gas burner element or solid fuel to cook to food placed on a cooking surface of the grill. In comparison to traditional upright barbecue grills, compact grills have a smaller configuration. The smaller configuration is typically achieved by reducing the overall height of the cooking chamber, which includes the cover and the firebox. In addition, manufacturers reduce the size and complexity of the frame assembly or the cart assembly supporting the cooking chamber. Due to their reduced configuration, compact barbecue grills are marketed as having increased portability such that the grill can be operated in more than one location and transported between locations.

Conventional compact barbecue grill assemblies, including the frame assemblies suffer from a number of limitations. Among the many limitations of the grill assemblies, most perform poorly in the process of cooking food. Others are too large and cumbersome for a single user to transport between locations. Still others are constructed from inferior materials causing the grill assembly to rapidly deteriorate. A substantial number of grill assemblies lack sufficient handle structures that can be used to transport the grill. With respect to the limitations of the frame assemblies, most are difficult to operate such that erecting and/or collapsing the frame assembly is quite difficult. Furthermore, when erect, the frame assemblies provide insufficient support for the cooking chamber such that the grill assembly lacks stability. When collapsed, the frame assemblies are unwieldy thereby rendering the grill assembly virtually impossible to transport between locations. In addition, numerous conventional frame assemblies lack wheels which further inhibits the transport of the grill assembly, in either the erect or the collapsed positions.

An example of a barbecue grill assembly suffering from the above limitations is found in U.S. Pat. No. 6,422,231 to Hamilton et al. As shown in FIGS. 1 and 4, the grill 20 assembly has a firebox 21 supported by a frame assembly having a plurality of generally vertical legs 29 that extend through openings 26a in the corners of the firebox 21. The legs 29 are adapted to be collapsed such that the grill assembly 20 is capable of transport by the operator (see FIG. 9). To collapse the legs 29, a door 26 operably connected to a bottom portion of the firebox 21 is opened to reveal a cavity of the firebox 21. The legs 29 pivot about pins 30 and into the cavity of the firebox 21. The side shelves 22, 23 are then rotated into contact with an upper portion of the firebox 21 thereby causing the grill assembly 20 to have a compact rectangular configuration (see FIG. 9). An operator can then grasp a handle extending from a side wall of the firebox 21 to transport the grill assembly 20. The grill assembly 20 lacks a cart assembly or wheels or any other structure to aid its transport when the legs 29 are collapsed or its repositioning when the legs 29 are erect.

Another barbecue grill assembly having the limitations detailed above is shown in U.S. Publication No. 2002/0020405 to Coleman et al. Referring to FIGS. 1 and 2, the grill assembly 10 includes a cooking chamber 12 defined by a hood 22 connected to a firebox 20. The cooking chamber 12 is removably mounted on a frame member 14 of the collapsible frame assembly 16. The frame assembly 16 includes a plurality of legs 38 and feet 42 adapted to increase the stability of the grill assembly 12. To move the grill assembly 10 from the erect position to the collapsed position of FIGS. 5 and 6, the knobs 35 are rotated to loosen and collapse the legs 38. In the collapsed position, the cooking chamber 12 is stacked on the leg assembly 16. In either the erect or collapsed position, the grill assembly 10 must be carried for transport or repositioning because the frame assembly 16 lacks a cart assembly or wheels.

Therefore, there is a definite need for a barbecue grill cart assembly having a collapsible cart assembly wherein the cart assembly provides support and stability to the grill assembly in both an erect position and a collapsed position, wherein the cart assembly is easy to operate, and wherein the cart assembly allows for transport or repositioning in either position. The present invention is provided to solve these and other problems.

SUMMARY OF THE INVENTION

The present invention relates to a barbecue grill cart assembly which includes a barbecue grill assembly and a collapsible cart assembly. The barbecue grill assembly comprises a cooking chamber and a frame assembly. The cooking chamber includes a cover connected to a firebox by a pair of hinges. Due to its dimensions, the barbecue grill assembly has a compact configuration. This means that the overall height of the barbecue grill assembly is less than that of conventional upright barbecue grills. The frame assembly is adapted to provide support to the cooking chamber where the cooking chamber is connected to the frame assembly. The cooking chamber and the frame assembly can be removably positioned on the cart assembly. A plurality of brackets adapted to connect the cooking chamber to the frame assembly. At least one mounting projection extends from a lower portion of the frame assembly to removably connect the cooking chamber to the cart assembly. Alternatively, the mounting projections are positioned on the cart assembly and the cooperating structure to receive the projection is positioned on the cooking chamber.

The collapsible cart assembly is adapted to provide both static and portable support to the cooking chamber and the frame assembly. The cart assembly is movable between an erect arrangement and a collapsed arrangement, however, in either arrangement, the cart assembly provides support for the grill assembly. The cart assembly comprises a first leg assembly and a second leg assembly wherein each leg assembly is pivotally connected to an upper frame member. A plurality of securing structures are affixed to the upper frame member to receive the projections of the frame assembly. A lower frame member is pivotally connected to a lower portion of the first leg assembly. The lower frame member is adapted to connect the first and second leg assemblies to secure the cart assembly in the erect arrangement.

In accord with the invention, the first leg assembly includes a pair of generally vertical legs—a front leg and a rear leg. Similarly, the second leg assembly includes a pair of generally vertical legs—a front leg and a rear leg. An elongated cross member is positioned between a lower portion of the second leg assembly. A pair of wheels are rotatably connected to the cross member. The frame member is pivotally connected to a lower portion of the front and rear legs of the first leg assembly. A second end of the lower frame member has a cross member and at least one securing element. The securing element is adapted to receive a portion of the cross member of the second leg assembly. In this manner, engagement between the securing element and the cross-member connects the first and second leg assemblies in the erect arrangement. In an unsecured state, the cart assembly can be moved to the collapsed arrangement. A portion of the cross member of the second end defines a handle that an operator can grasp to move the securing element between the secured and unsecured states.

The upper frame member is a generally horizontal structure or platform that is adapted to receive the frame assembly. The upper frame member defines a mounting surface to which the grill assembly is releasably mounted. At least one vertical wall extends from the top wall of the upper frame member to define a first receiver and a second receiver that are adapted to receive a first mounting projection. In addition, at least one first cavity extends from the top wall of the upper frame member to define a sheath that slidably engages or receives a second mounting projection. Alternatively, the mounting projections extend from the upper frame member and the receivers and/or the cavities are positioned on an extent of the frame assembly.

In further accord with the invention, when the cart assembly is in the erect arrangement, the components of the cart assembly are positioned such that the upper frame member and/or the cooking chamber is elevated above the ground. In the erect arrangement, the first and second leg assemblies are positioned substantially vertical to the upper frame member. In the collapsed arrangement, the components of the cart assembly are positioned such that the upper frame member and/or the cooking chamber are relatively close to the ground. To move the cart assembly from the erect arrangement to the collapsed arrangement, the securing element of the lower frame member is disengaged from the cross member of the second leg assembly. Next, the lower frame member is then fed between the legs of the second leg assembly causing the leg assemblies to converge. The lower frame member is further positioned beyond the second side portion causing the first and second leg assemblies to intersect. Next, the first leg assembly is then folded towards the upper frame member and positioned proximate a lower surface of the upper member. The second leg assembly is then folded towards the upper frame member and the lower frame member is positioned below the second leg assembly to define the collapsed arrangement. Since the frame member is fed through the second leg assembly, the first leg assembly is positioned within the second leg assembly in the collapsed arrangement. In the collapsed arrangement, the lower frame member is positioned below the first leg assembly.

In still further accord with the invention, the frame member is elevated from the collapsed arrangement to define a transport arrangement. In the transport arrangement, the frame member functions as a lever and/or handle for transporting the cart assembly. The barbecue grill assembly is coupled to the cart assembly such that an operator can grasp the handle to easily transport the barbecue grill assembly with the use of the frame member and the wheels. In the transport arrangement, the upper frame member is positioned generally parallel to the ground which increases the stability of the barbecue grill assembly during actual transport. When the barbecue grill assembly is connected to the cart assembly in the transport arrangement, the barbecue grill assembly is in a generally horizontal position which aids the actual transport of the grill assembly.

Other features and advantages of the invention will be apparent from the following specification taken in conjunction with the following drawings.

BRIEF DESCRIPTION OF THE DRAWINGS

FIG. 16 is a schematic view of the grill assembly of FIG. 1, showing the cart assembly in the collapsed arrangement; and, FIG. 17 is a schematic view of the grill assembly of FIG. 1, showing the cart assembly in the collapsed arrangement.

DETAILED DESCRIPTION OF THE INVENTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
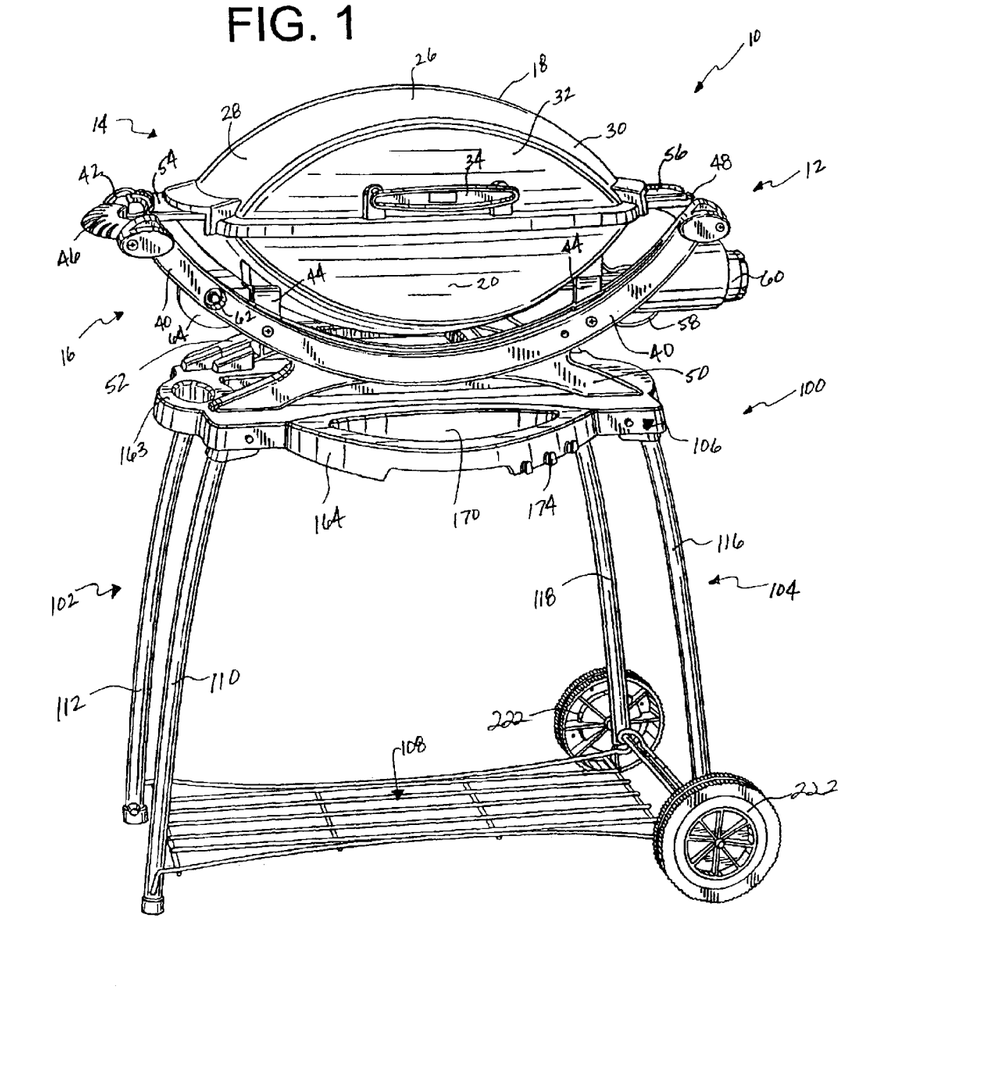
FIG. 1 is a perspective view of a barbecue grill assembly of the invention showing a cooking chamber, a support frame assembly, and a cart assembly of the invention.

A barbecue grill cart assembly 10 is shown in FIG. 1. The barbecue grill cart assembly 10 includes a barbecue grill assembly 12 and a collapsible cart assembly 100. The barbecue grill assembly 12 comprises a cooking chamber 14 and a frame assembly 16. The cooking chamber 14 includes a cover 18 connected to a firebox 20 by a pair of hinges 22. A grate is removably positioned generally within the firebox 20. The grate defines a cooking surface upon which food is placed during operation of the grill assembly 10. Due to its dimensions, the barbecue grill assembly 12 has a compact configuration. This means that the overall height of the barbecue grill assembly 12 is less than that of conventional upright barbecue grills. As a result, the barbecue grill assembly 12 is capable of operation while positioned on a table top or on the cart assembly 100. Furthermore, the barbecue grill assembly 12 is sized such that it can be lifted by a single operator and transported between locations for use. Additionally, the barbecue grill assembly 12 is sized such that a single operator can reposition or transport the barbecue grill assembly 12 between locations.

The cover 18 has a geometry defined by a top wall 26, a first side wall 28, a second side wall 30, a front wall 32, and a rear wall (not shown). Although the cover 18 is shown as having a curvilinear configuration with curved or sloped walls 26, 28, 30, 32 the cover 18 can have a generally linear configuration. A handle 34 adapted to allow a user to lift the cover 18 extends from the front wall 32. The firebox 20 has a geometry defined by a first side wall, a second side wall, a front wall 36, a rear wall, and a bottom wall. Preferably, the firebox 20 has a configuration similar to that of the cover 18 such that the firebox 20 engages the cover 18 when the barbecue grill assembly 12 is in a closed position. A burner element is positioned generally within a lower portion of the firebox 20. Preferably, the burner element is a burner tube or loop, however, a conventional ring or H-shaped burner can be employed in the barbecue grill assembly 10. A drain opening is positioned in the bottom wall of the firebox 20. The drain opening is adapted to drain grease and other byproducts that are generated by cooking food on the grate 24.

The support frame assembly 16 is adapted to provide support to the cooking chamber 14 where the cooking chamber 14 is connected to the frame assembly 16. The cooking chamber 14 and the frame assembly 16 can be removably positioned on the cart assembly 100 as explained below. Alternatively, the frame assembly 16 provides support when placed on an alternate surface. For example, the barbecue grill assembly 12 can be positioned on a table top or on the ground. The frame assembly 16 has a first or front structure 40 and a second or rear structure 42. As shown in FIG. 1, the front and rear structures 40, 42 have a generally curvilinear configuration. A plurality of brackets 44 adapted to connect the cooking chamber 14 to the frame assembly 16 are positioned between the front and rear structures 40, 42 and a lower portion of the firebox 20. A first cross member 46 and a second cross member 48 are positioned between an upper portion of the front and rear structures 40, 42. The first and second cross members 46, 48 are adapted to function as handles wherein an operator can utilize the cross members 46, 48 to transport the cooking chamber 14. At least one mounting projection 50 extends from a lower portion of the front structure 40. Similarly, at least one mounting projection 52 extends from a lower portion of the rear structure 42. As explained below, the mounting projection 50, 52 are adapted to be received by cooperating structures on the cart assembly 100 to removably connect the cooking chamber 14 to the cart assembly 100. Alternatively, the mounting projections are positioned on the cart assembly 100 and the cooperating structure to receive the projections is positioned on the cooking chamber 14.

A first work surface 54 and a second work surface 56 are each pivotally connected to a portion of the support frame assembly 16. As shown in FIG. 1, the work surfaces 54, 56 are pivoted into the cooking chamber 14 to define a stored position. A fuel source (not shown) provides combustible fuel to the burner element and is supported by a ring 58 that is positioned between the front and rear structures 40, 42. A regulator assembly 60 adapted to meter the flow of fuel to the burner element is positioned between the front and rear structures 40, 42. An ignitor button 62 and finger guide 64 extend from the front structure 40 of the support frame assembly 16.

In another preferred embodiment, the support frame assembly 16 is omitted from the grill assembly 10 such that the cooking chamber 14 has means for mounting the cooking chamber 14 directly to the cart assembly 100. Mounting means includes projections, brackets, or elongated structures extending from a portion of the firebox 20. In the event that the cooking chamber 14 is formed from cast material, the mounting means are preferably formed from the same material. In any event, the mounting means are intended to be received by cooperating structures on the cart assembly 100 to connect the cooking chamber 14 to the cart assembly 100.

The collapsible cart assembly 100 is adapted to provide both static and portable support to the cooking chamber 14 and the frame assembly 16. As discussed below, the cart assembly 100 is movable between an erect arrangement and a collapsed arrangement, wherein the components of the cart assembly 100 are configured in different positions for each arrangement. In either arrangement, the cart assembly 100 provides support for the cooking chamber 14. Referring to FIG. 1, the cart assembly 100 is shown in the erect or deployed arrangement and comprises a first leg assembly 102 and a second leg assembly 104 wherein each leg assembly 102, 104 is pivotally connected to an upper frame member 106. In the erect arrangement, the leg assemblies 102, 104 are transversely positioned to the upper frame member 106. The upper frame member 106 is a generally horizontal platform that is adapted to receive the support frame assembly 16. A plurality of securing structures (described below) are affixed to the upper frame member 106 to receive the frame assembly 16. A lower frame member 108 is pivotally connected to a lower portion of the first leg assembly 102. The lower frame member 108 is adapted to connect the first and second leg assemblies 102, 104 to secure the cart assembly 100 in the erect arrangement.

Figure 2:
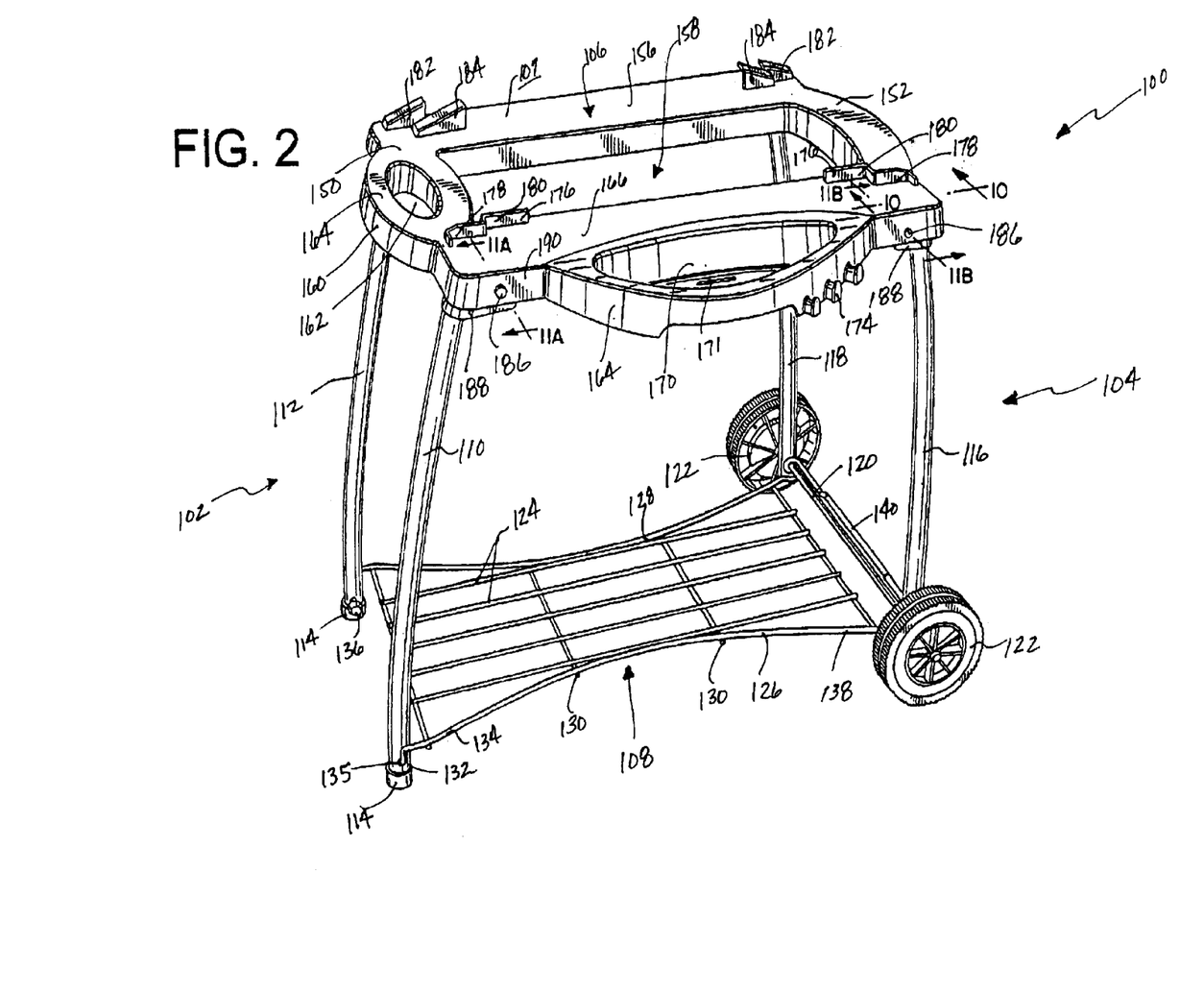
FIG. 2 is a perspective view of the grill assembly of FIG. 1, showing the cart assembly with the cooking chamber removed.

As shown in FIG. 2, the first leg assembly 102 includes a pair of generally vertical legs—a front leg 110 and a rear log 112. The legs 110, 112 and a first side portion 150 of the upper frame member 106 define a perimeter of the first leg assembly 102. A cap 114 adapted to prevent unwanted movement or skidding of the cart assembly 100 is positioned at a lower portion of the front and rear legs 110, 112. Similarly, the second leg assembly 104 includes a pair of generally vertical legs—a front leg 116 and a rear leg 118. An elongated cross member 120 is positioned between a lower portion of the second leg assembly 104. The legs 116, 118, the second side portion 152 of the upper frame member, and the cross member 120 define a perimeter of the second leg assembly 104. A pair of wheels 122 are rotatably connected to the cross member 120. Preferably, the legs 110, 112, 116, 118 are tubular members that have a generally cylindrical configuration when viewed in cross-section. Alternatively, the legs 110, 112, 116, 118 have a square or rectangular configuration when viewed in cross-section. The legs 110, 112, 116, 118 can be fabricated from aluminum or another metal with properties of relatively high strength and low weight.

Figures 3, 4, 5:
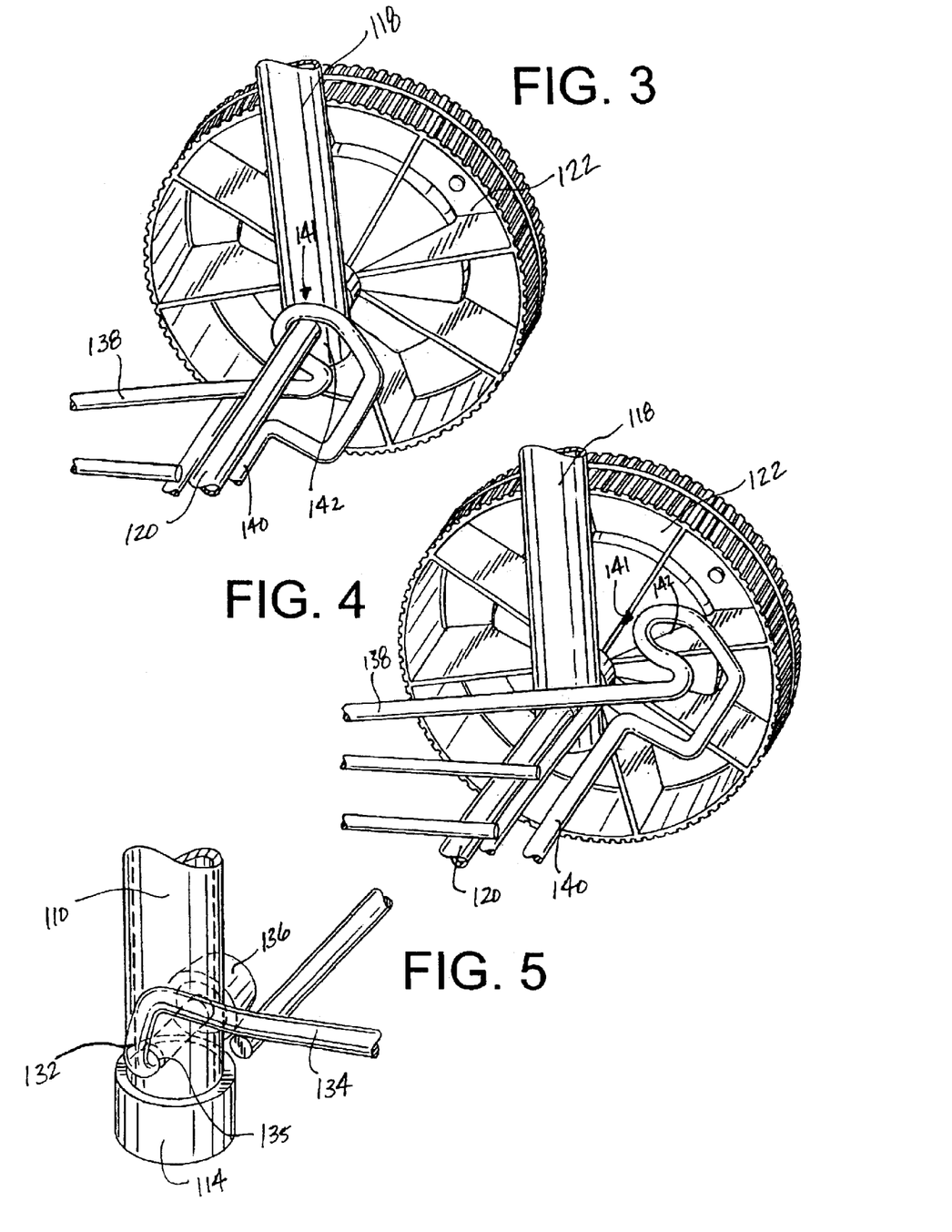
FIG. 3 is a detail view of the grill assembly of FIG. 1, showing means for securing the cart assembly in an erect arrangement.
FIG. 4 is a detail view of the grill assembly of FIG. 1, showing means for securing the cart assembly in an erect arrangement.
FIG. 5 is a detail view of the grill assembly of FIG. 1, showing a lower portion of the cart assembly.

The lower frame member 108 is preferably formed from a plurality of elongated members 124 positioned between a front curvilinear member 126 and a rear curvilinear member 128. The lower frame member 108 further includes a plurality of transverse members 130. The members 124, 126, 128, 130 are preferably formed from metal wherein the lower frame member 108 is a wire rack. Alternatively, the lower frame 108 is formed from sheet steel or plastic. The frame member 108 is pivotally connected to a lower portion of the front and rear legs 110, 112 of the first leg assembly 102. Referring to FIG. 5, pins 132 extend from a first end 134 of the frame member 108 wherein the pins 132 are received by an opening 134 in the front and rear legs 110, 112. The pin 132 and opening 134 are cooperatively dimensioned such that the frame member 108 is pivotable about the opening 134. A cap 136 mates with an extent of the pin 132 that extends beyond the opening 134. Preferably, the members 124, 126, 128, 130 are welded to form the frame member 108, however, other methods can be utilized to fabricate the frame member 108.

As shown in FIGS. 3 and 4, a second end 138 of the lower frame member 108 has a cross member 140. The second end 138 also has a pair of securing elements 141. The securing element 141 defines a recess 142 adapted to receive a portion of the cross member 120 of the second leg assembly 104. Alternatively, the securing element 141 receives a different portion of the second leg assembly 104, such as one of the legs 116, 118. Preferably, the recess 142 has a curvilinear configuration. In this manner, engagement between the securing element 141 and the cross-member 120 connects the first and second leg assemblies 102, 104 thereby increasing the structural rigidity and stability of the cart assembly 100 in the erect arrangement. The cart assembly 100 is in a secured state in FIG. 3 and in an unsecured state in FIG. 4. In the unsecured state, the cart assembly 100 can be moved to the collapsed arrangement. The lower frame member 108 and the leg assemblies 102, 104 are configured such that when the securing element 141 receives the cross member 120, the leg assemblies 102, 104 are under tension. A portion of the cross member 140 of the second end 138 defines a handle 144. Preferably, the handle 144 is an elongated structure that an operator can grasp to move the securing element 141 between the secured and unsecured states of FIGS. 3 and 4. To move the securing element 141 from the unsecured state to the secured state, the operator grasps the handle 144 and applies a sufficient amount of force to the handle 144 to displace the lower frame member 108 towards the first leg assembly 102 and then in a generally downward direction wherein the recess 142 engages the cross member 120. To move the securing element 141 from the secured state to the unsecured state, the operator grasps the handle 144 and displaces the lower frame member 108 towards the first leg assembly 102 and then in a generally upward direction wherein the recess 142 disengages the cross member 120.

The upper frame member 106 is a generally horizontal structure or platform that is adapted to receive the frame assembly 16. The upper frame member 106 defines a mounting surface 107 to which the grill assembly 12 is releasably mounted. The upper frame member 106 is preferably fanned from plastic, however, the frame member 106 can be formed from metal. The upper frame member 106 has generally rectangular configuration defined by a first side portion 150, a second aide portion 152, a front portion 154, and a rear portion 156. Preferably, the upper frame member 106 also has a central opening 158 defined by an internal or central side wall 159. The first side portion 150 has a first side wall 160 and an opening 162 defining a platform handle 163. The handle 163 is adapted to allow an operator to carry the cart assembly 100 when it is in the collapsed arrangement (see FIG. 7). Furthermore, the handle 163 is adapted to allow the operator to reposition the cart assembly 100 and the attached cooking chamber 14 when in the erect arrangement (see FIG. 1). The second side portion 152 has a generally curvilinear configuration. The front portion 154 has a basin 164 extending from a top wall 166 and a side wall 168 of the front portion 154. The basin 164 has a recess 170 with a slot 171 that is adapted to receive means for tethering 172 (see FIG. 6) the cooking chamber 14 to the cart assembly 100. The tethering means 172 van be an flexible or rigid strap that connects with a portion of the cooking chamber 14, for example the handle 163. The tethering means can employ a hook, Velcro®, or snaps to further secure the cooking chamber 14. While the cooking chamber 14 is in operation, the tethering means can be stored. At least one finger 174 adapted to receive cooking utensils extends from a front portion of the basin 164.

Referring to FIGS. 1 and 2, at least one vertical wall 176 extends from the top wall 166 of the front portion 154. Preferably, the wall 176 extends substantially perpendicular from the top wall 166. The wall 176 has a plurality of segments defining a first receiver 178 and a second receiver 180. While the first receiver 178 and the second receiver 180 are both adapted to receive the mounting projections 50 of the frame assembly 16, the first receiver 178 is adapted to receive mounting projections 50 of a first frame assembly 16 having a larger configuration than that of a second frame assembly 16. In addition, at least one first cavity 182 extends from a top wall 157 of the rear portion 156. Also, at least one second cavity 184 extends from the top wall 157 of the rear portion 156. The cavities 182, 184 have a vertical wall component and a horizontal wall component to define a sheath that slidably engages or receives a portion of the mounting projection 52. The first and second cavities 182, 184 are adapted to receive the mounting projections 52 of the frame assembly. The first cavity 182 of the back portion 156 is cooperatively positioned with the first receiver 178 of the front portion 154. Similarly, the second cavity 184 of the back portion 156 is cooperatively positioned with the second receiver 180 of the front portion 154. Therefore, the receivers 178, 180 and the cavities 182, 184 enable the upper frame member 106 to receive mounting projections 50 having different dimensions or different dimensioned cooking chambers 12, thereby increasing the versatility of the cart assembly 100. A horizontal sliding movement is used to position the projections 52 of the frame assembly 16 in the cavities 182, 184 to connect the cooking chamber 14 to the cart assembly 100. In the event that the frame assembly 16 is omitted from the grill assembly 10, the cooking chamber 14 can be directly received by the receivers 178, 180 and the cavities 182, 184 of the upper frame member 106. Alternatively, the mounting projections 50, 52 extend from the upper frame member 206 and the receivers 178, 180 and/or the cavities 182, 184 are positioned on an extent of the frame assembly 16. In yet another alternative, the frame assembly 16 is omitted and the cavities 182, 184 are positioned on an extent of the cooking chamber 14, primarily the firebox 20.

As stated above, the leg assemblies 102, 104 are pivotally connected to the upper frame member 106. Referring to FIGS. 2, 10, 11A, and 11B, the first leg assembly 102 is pivotally connected to the upper frame member 106 near the first portion 150 and the second leg assembly 104 is pivotally connected near the second portion 152. Focusing on the front leg 116 of the second leg assembly 116 shown in FIG. 10, the leg 116 is operably connected to the upper frame member 106 by a pin 186 extending through a collar 188 and an opening in the side wall 190 of the front portion 154. The remaining legs 110, 112, 118 are pivotally connected to the upper frame member 106 in a similar manner. The collar 188 has a sleeve 192 that receives an extent of an upper portion 116a of the leg 116. A gripping element can be positioned between the sleeve 192 and the upper portion 116a to further secure the upper portion 116a within the sleeve 192. The collar 188 and the leg 116 pivot about an axis defined by the pin 186.

Figures 10, 11A:
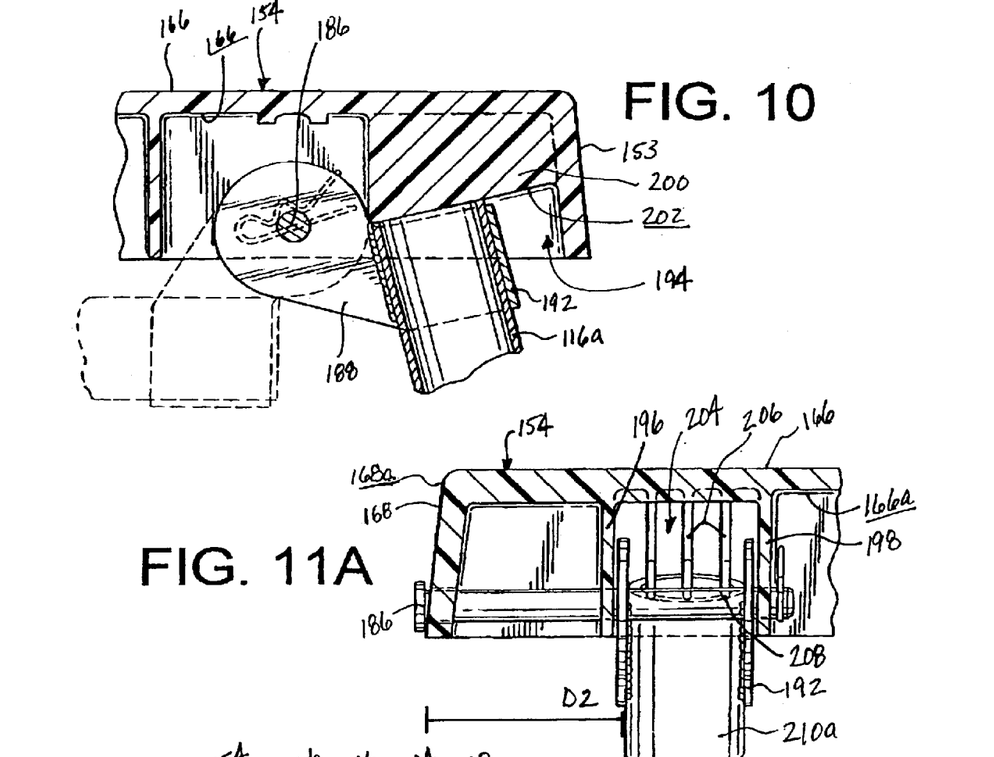
FIG. 10 is a cross-section view of the grill assembly of FIG. 1 taken along line 10—10 of FIG. 9, showing a leg assembly in the erect arrangement.
FIG. 11A is a cross-section view of the grill assembly of FIG. 1 taken along line 11A—11A of FIG. 9, showing a leg assembly in the erect arrangement.
Figure 11B:
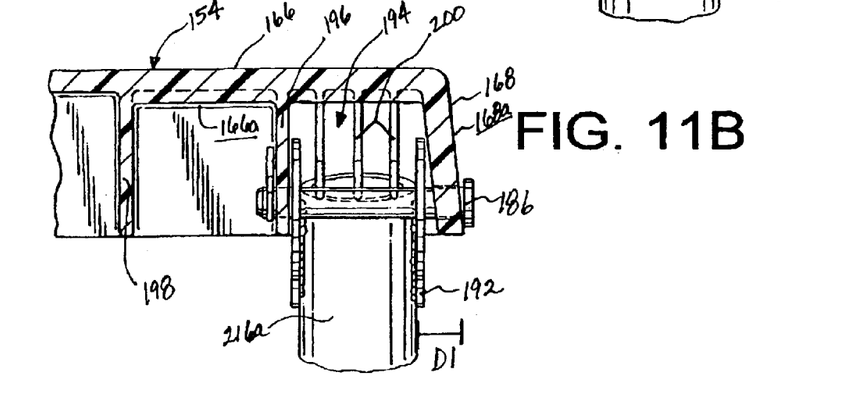
FIG. 11B is a cross-section view of the grill assembly of FIG. 1 taken along line 11B—11B of FIG. 9, showing a leg assembly in the erect arrangement.
Figure 12:
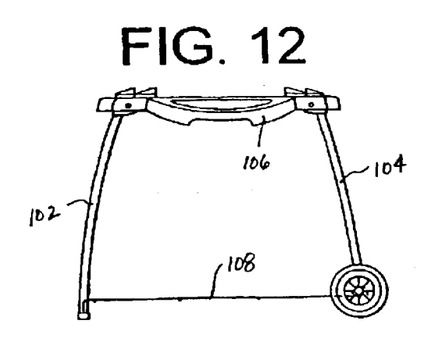
FIG. 12 is a schematic view of the grill assembly of FIG. 1, showing the cart assembly in the erect arrangement.
Figure 13:
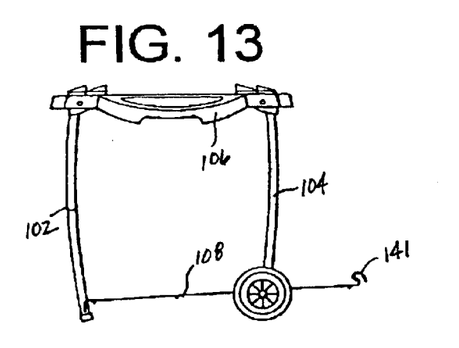
FIG. 13 is a schematic view of the grill assembly of FIG. 1, showing the cart assembly in an intermediate arrangement.
Figure 14:
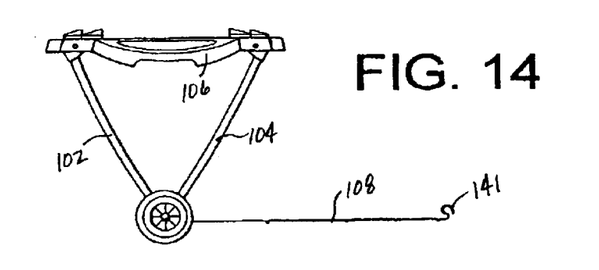
FIG. 14 is a schematic view of the grill assembly of FIG. 1, showing the cart assembly in the intermediate arrangement.

Referring to FIGS. 10 and 11B, the leg 116 is shown in the erect arrangement (the dotted lines of FIG. 10 reflect the leg 116 and the collar 188 in the collapsed arrangement). In the erect arrangement, the upper portion 116a of the leg 116 positioned within a first receptacle 194. As shown in FIG. 11B, the receptacle 194 is bounded by the side wall 168 and a first internal wall 196 that depends in a substantially vertical direction from an inner surface 166a of the top wall 166. The first internal wall 196 is positioned between a second internal wail 198 and the side wall 168. The receptacle 194 comprises a plurality of ridges 200 that depend in a substantially vertical direction from the inner surface 166a. The ridges 200 depend along an extent of the receptacle 194, however, the degree or amount that they depend varies with the design parameters of the cart assembly 100. The ridges 200 define an engaging surface 202 that contacts the upper edge of the leg 116. Alternatively, the collar 188 is positioned such that the surface 196 contacts an edge of the collar 188. As shown in FIG. 10, the engaging surface 202 is angled or sloped compared to the top wall 166 to prevent the leg 116 from over-rotating. Since the leg 116 has a bowed or curvilinear configuration (see FIGS. 1 and 2), the sloped engaging surface 202 ensures that the upper frame member 106 is generally parallel to the ground when the cart assembly is in the erect arrangement. Due to the angled surface 202, the leg 116 is positioned at an angle to the receptacle 194 where the angle is measured between the upper portion 116a of the leg 116 (or the sleeve 192) and the lower boundary of the receptacle 194. Referring to FIG. 11B, the leg 116 is positioned a distance D1 from the side wall 168, where the distance is measured between the outer surface of the upper portion 116a and the surface 168a of the side wall 168.

In FIG. 11A, the front leg 110 of the first leg assembly 102 is shown in the erect arrangement. In the erect arrangement, the upper portion 110a of the leg 110 is positioned within a second receptacle 204. In contrast to the first receptacle 194, the second receptacle 204 is bounded by the first internal wall 196 and the second internal wall 198. Thus, the second receptacle 204 is positioned further from the side wall 168 than the first receptacle 194. The second receptacle 204 comprises a plurality of ridges 206 that depend in a substantially vertical direction from the inner surface 166a. The ridges 206 define an engaging surface 208 that contacts the upper edge of the leg 110. Like the engaging surface 202 of the first receptacle 194, the engaging surface 208 is angled or sloped compared to the top wall 166 to prevent the leg 116 from over-rotating. The upper portion 110a of the leg 110 is positioned a distance D2 from the surface 168a of the side wail 168. Because the second receptacle 204 is positioned is positioned further from the side wall 168 than the first receptacle 194, the distance D2 is greater than the distance D1. The first leg assembly 102 defines a first leg perimeter P1 and the second leg assembly 104 defines a second leg perimeter P2. Due to the positioning of the first and second receptacles 194, 204 and the leg assemblies 102, 104, the first leg perimeter P1 is less than the second leg perimeter P2. Furthermore, the first leg assembly 102 is positioned substantially within the second leg assembly 104 in the collapsed position.

Referring to FIGS. 1 and 2, the cart assembly 100 is in the erect arrangement. In the erect arrangement, the components of the cart assembly 100 are positioned such that the upper frame member 106 and/or the cooking chamber 14 is elevated above the ground. In the erect arrangement, the upper frame member 106 defines a plane that is generally parallel to the ground. Similarly, the lower frame member 108 defines a plane that is generally parallel to the ground. In the erect arrangement, the securing elements 141 are in the secured state whereby the cart assembly 100 is stable and capable of supporting the cooking chamber 14. This means that the recess 142 receives a portion of the cross member 120. However, in the erect arrangement, an operator can move the cart assembly 100 and the attached cooking chamber 14 by simply grasping the handle 163 and applying a force thereto. In this manner, the cart assembly 100 and the cooking chamber 14 can be repositioned to a preferred location. In the erect arrangement, the first and second leg assemblies 102, 104 are positioned substantially vertical to the upper frame member 106. In FIG. 2, the cooking chamber 14 (and the frame assembly 16) have been detached from the cart assembly 10, although the cart assembly 100 remains in the erect arrangement.

Figure 7:
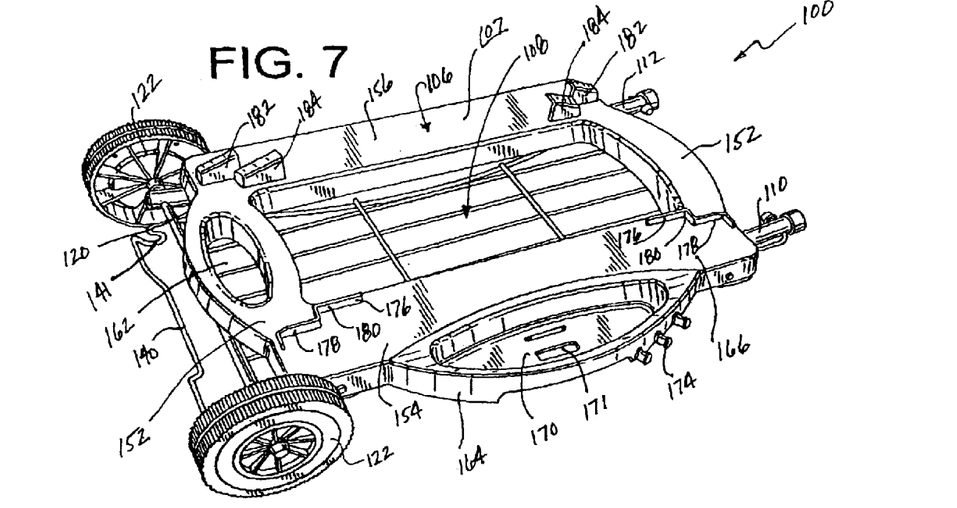
FIG. 7 is a perspective view of the grill assembly of FIG. 1, showing the cart assembly in the collapsed arrangement.
Figure 8:
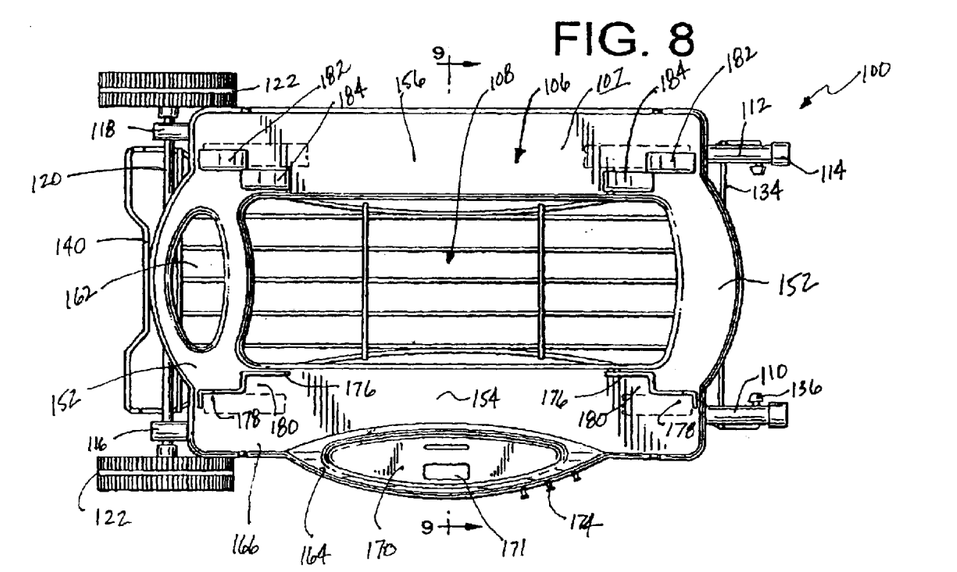
FIG. 8 is a top view of the grill assembly of FIG. 1, showing the cart assembly in the collapsed arrangement.
Figure 9:
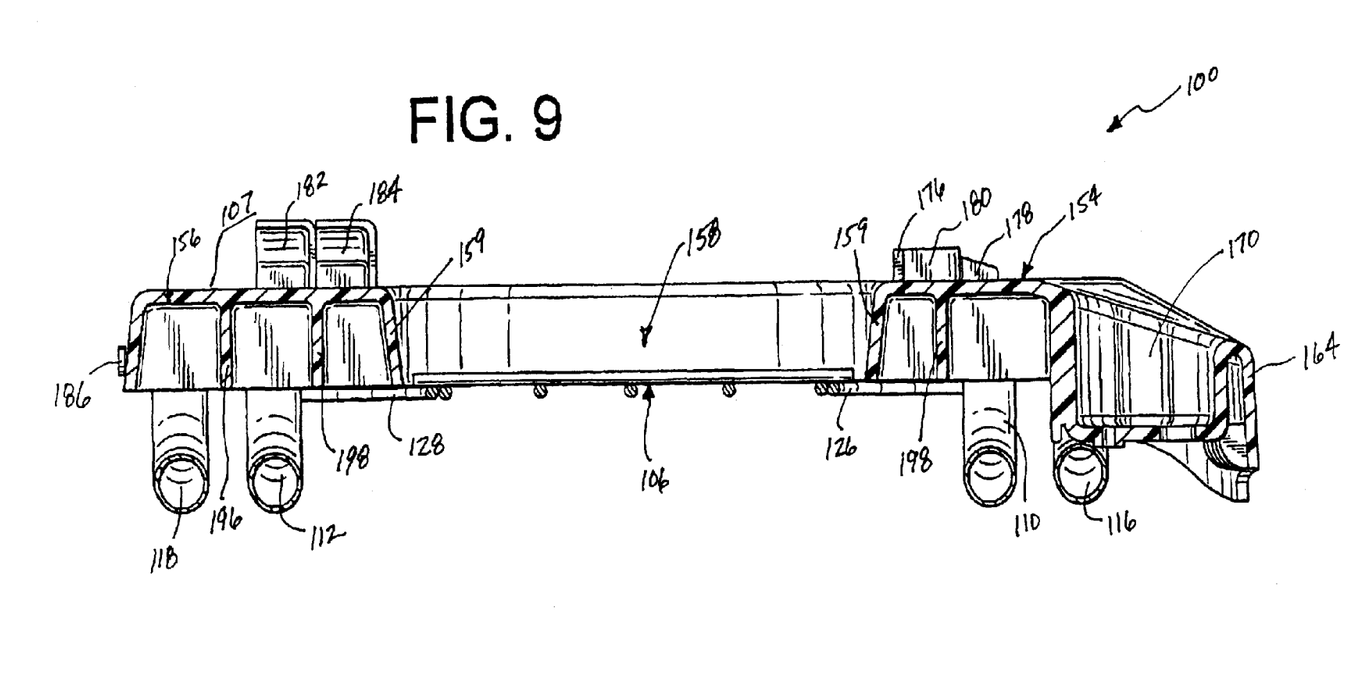
FIG. 9 is a cross-section view of the grill assembly of FIG. 1 taken along line 9—9 of FIG. 8, showing the cart assembly in the collapsed arrangement.
Figure 15:
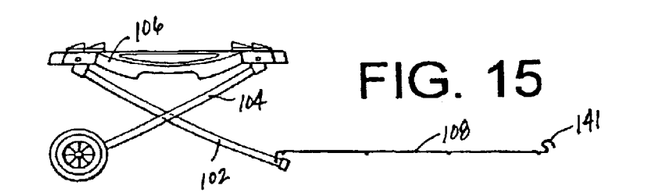
FIG. 15 is a schematic view of the grill assembly of FIG. 1, showing the cart assembly in the intermediate arrangement.

In FIGS. 7–9, the cart assembly 100 is shown in the collapsed arrangement. In the collapsed arrangement, the components of the cart assembly 100 are positioned such that the upper frame member 106 and/or the cooking chamber 14 are relatively close to the ground. Although the cooking chamber 14 is not shown in FIGS. 7–9, it can be coupled to the cart assembly 100 in the collapsed arrangement. FIGS. 12–17 schematically depict the progression of the cart assembly 100 from the erect arrangement to the collapsed arrangement. To move the cart assembly 100 from the erect arrangement to the collapsed arrangement, the securing element 141 of the lower frame member 108 is disengaged from the cross member 120 of the second leg assembly 104. Next, the lower frame member 108 is then fed between the legs 116, 118 of the second leg assembly 104 causing the leg assemblies 102, 104 to converge (see FIGS. 13 and 14). Described in a different manner, the lower frame member 108 is passed through the second leg assembly 104 to bring the leg assemblies 102, 104 into close proximity. When the leg assemblies 102, 104 converge, an extent of the lower frame member 108 extends past the second aide portion 152 of the upper frame member 106. As shown in FIG. 15, the lower frame member 108 is further positioned beyond the second side portion 152 causing the first and second leg assemblies 102, 104 to intersect At this stage, a substantial extent of the lower frame member 108 extends past the second side portion 152 of the upper frame member 106. Next, the first leg assembly 102 is then folded towards the upper frame member 106 and positioned proximate a lower surface of the upper member 106. The second leg assembly 104 is then folded towards the upper frame member 106 and the lower frame member 108 is positioned below the second leg assembly 104 to define the collapsed arrangement (see FIG. 17). Alternatively, the upper frame member 106 is allowed to descent in a generally downward direction to arrive at the collapsed arrangement of FIGS. 7–9 and 17. Because the frame member 108 is fed through the second leg assembly 104, the first leg assembly 102 is positioned within the second leg assembly 104. Since the fist leg perimeter P1 is less than the second leg perimeter P2, the legs 110, 112 of the first assembly 102 do not make contact with the legs 116, 118 of the second assembly 104.

Referring to FIGS. 7 and 8, in the collapsed arrangement, the components of the cart assembly 100 are positioned such that the upper frame member 106 is generally parallel to the ground. Likewise, the lower frame member 108 is generally parallel to the ground. In the collapsed arrangement, a lower portion of the first leg assembly 102, including the region where the lower frame member 108 is pivotally connected to the first leg assembly 102, extends beyond the second side portion 132. In addition, the securing elements 141 and the handle 144 extend beyond the first side portion 150. In the collapsed arrangement, the lower frame member 108 is positioned below the first leg assembly 102. Also, the first and second leg assemblies 102, 104 are positioned between the upper frame member 106 and the lower frame member 108. In the collapsed arrangement, the lower frame member 108 is positioned within the second perimeter P2 defined by the second leg assembly 104. Furthermore, a portion of the lower frame member 108 is visible through the central opening 158 when the cart assembly 100 is viewed from above. Similarly, a portion of the second mid 138 of the frame member 108 is visible through the opening 162 of the first portion 150 of the upper frame member 106.

Preferably the barbecue grill assembly 12 is detached from the cart assembly 100 prior to moving the cart assembly 100 from the erect arrangement to the collapsed arrangement. Once the cart assembly 100 reaches the collapsed arrangement, the barbecue grill assembly 12 can be mounted on the upper frame member 106.

Figure 6:
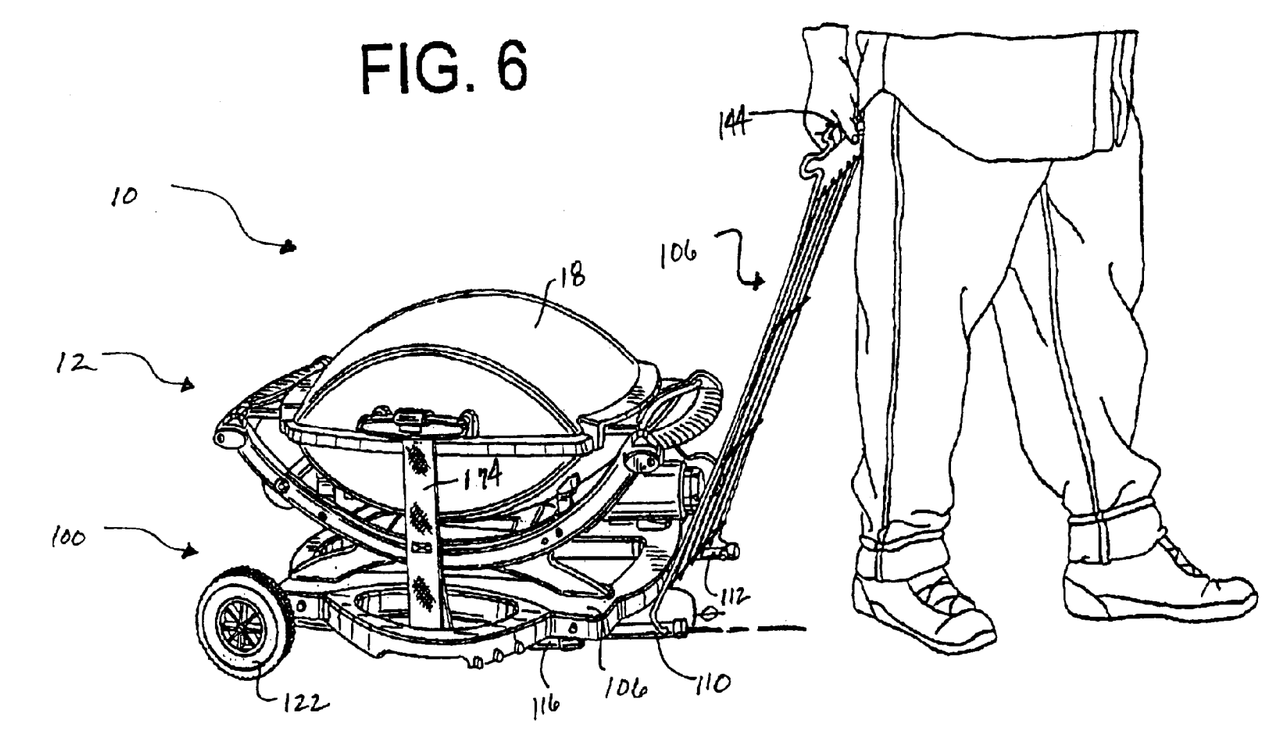
FIG. 6 is a perspective view of the grill assembly of FIG. 1, showing the cart assembly in a collapsed arrangement and being transported by an operator.
Figures 16, 17:
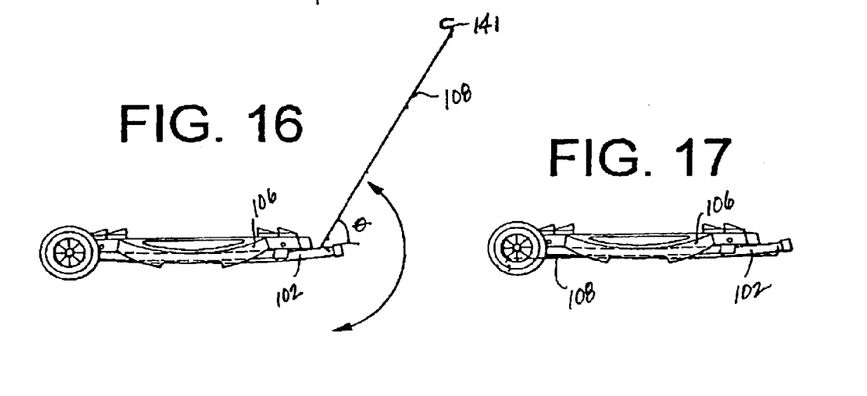

As shown in FIGS. 6 and 16, the frame member 108 is elevated from the collapsed arrangement to define a transport arrangement. In the transport arrangement, the frame member 108 functions as a lever and/or handle for transporting the cart assembly 100. As shown in FIG. 6, the barbecue grill assembly 12 is coupled to the cart assembly 100 such that an operator can grasp the handle 144 to easily transport the barbecue grill assembly 12 with the use of the frame member 108 and the wheels 122. The tether means 172 is used to further secure the barbecue grill assembly 12 to the cart assembly 100. In the transport arrangement, the upper frame member 106 is positioned generally parallel to the ground which increases the stability of the barbecue grill assembly 12 during actual transport. When the barbecue grill assembly 12 is connected to the cart assembly 100 in the transport arrangement, the barbecue grill assembly 12 is in a generally horizontal position which aids the actual transport of the grill assembly 10. In the transport arrangement, the frame member 108 extends beyond the cooking chamber 14 and the upper frame member 106. As a result, neither the cooking chamber 14 nor the upper frame member 106 interfere with the pivotal movement of the frame member 108. Also, the frame member 108 is positioned at an angle $\theta$ to the first leg assembly 102. The angle $\theta$ varies with the design parameters of the cart assembly 100 and the physical size of the operator. The angle $\theta$ also varies as the grill assembly 10 is transported over elevating terrain. The transport arrangement greatly increases the versatility and utility of the barbecue grill cart assembly 10.

While the specific embodiments have been illustrated and described, numerous modifications come to mind without significantly departing from the spirit of the invention and the scope of protection is only limited by the scope of the accompanying Claims.

We claim:

1. A barbecue grill cart assembly comprising:
a barbecue grill assembly having a cooking chamber and a frame assembly; and,
a cart assembly having a first leg assembly and a second leg assembly both pivotally connected to an upper frame member, the cart assembly further having a lower frame member pivotally connected to the first leg assembly, the lower frame member having a securing element, wherein the cart assembly is movable between an erect arrangement and a collapsed arrangement, and wherein in the erect arrangement the securing element engages a cross member of the second leg assembly and the first and second leg assemblies are positioned transverse to the upper frame member.

2. A barbecue grill cart assembly comprising:
a barbecue grill assembly having a cooking chamber and a frame assembly; and, a cart assembly having a first leg assembly and a second leg assembly both pivotally connected to an upper frame member, the cart assembly further having a lower frame member pivotally connected to the first leg assembly, the lower frame member having a securing element, wherein the cart assembly is movable between an erect arrangement and a collapsed arrangement, and wherein in the erect arrangement the securing element engages a portion of the second leg assembly and the first and second leg assemblies are positioned transverse to the upper frame member, and wherein the securing element is disengaged from the second leg assembly and inserted through the second leg assembly to move the cart assembly from the erect arrangement to the collapsed arrangement.

3. The barbecue grill cart assembly of claim 2 wherein the first leg assembly is positioned substantially within the second leg assembly in the collapsed arrangement.

4. The barbecue grill cart assembly of claim 2 wherein the lower frame member is positioned below the first leg assembly in the collapsed arrangement.

5. The barbecue grill cart assembly of claim 2 wherein the upper frame member is generally parallel to the ground in the collapsed arrangement.

6. The barbecue grill cart assembly of claim 2 wherein the lower frame member is positioned beyond the cooking chamber and the frame assembly to further define a transport arrangement.

7. The barbecue grill cart assembly of claim 6 wherein the second leg assembly has at least one wheel and wherein a portion of the lower frame member defines a handle that an operator can grasp to transport the cart assembly.

8. The barbecue grill cart assembly of claim 7 wherein the upper frame member remains generally parallel to the ground while the barbecue grill cart assembly is transported.

9. The barbecue grill cart assembly of claim 2 wherein the lower frame member is in an elevated position with respect to the first leg assembly to further define a transport arrangement.

10. The barbecue grill cart assembly of claim 9 wherein the second leg assembly has at least one wheel and wherein a portion of the lower frame member defines a handle that an operator can grasp to transport the cart assembly.

11. The barbecue grill cart assembly of claim 10 wherein the barbecue grill assembly remains generally horizontal to the ground while the barbecue grill cart assembly is transported.

12. A cart assembly for use with a barbecue grill assembly comprising:
an upper frame member;
a first leg assembly and a second leg assembly, wherein the leg assemblies are pivotally connected to the upper frame member, and wherein the second leg assembly has a cross member at a lower portion of the leg assembly;
a lower frame member pivotally connected to the first leg assembly, wherein the lower frame member has a securing element; and,
wherein the cart assembly is movable between an erect arrangement and a collapsed arrangement, and wherein in the erect arrangement the securing element engages a portion of the cross member and the first and second leg assemblies are positioned transverse to the upper frame member.

13. The cart assembly of claim 12 wherein the securing element defines a recess that is adapted to receive a portion of the cross member in the erect arrangement.

14. The cart assembly of claim 12 wherein in the erect arrangement, the upper frame member is generally parallel to the ground.

15. The cart assembly of claim 12 wherein in the erect arrangement, the lower frame member is generally parallel to the ground.

16. The cart assembly of claim 12 wherein in the erect arrangement, the cart assembly is adapted to support a barbecue grill assembly.

17. The cart assembly of claim 12 wherein the securing element is disengaged from the cross member and passed through a perimeter of the second leg assembly to move the cart assembly from the erect arrangement to the collapsed arrangement.

18. The cart assembly of claim 17 wherein the first leg assembly is positioned substantially within the perimeter of the second leg assembly in the collapsed position.

19. The cart assembly of claim 17 the first and second leg assemblies are positioned between the upper frame member and the lower frame member in the collapsed arrangement.

20. The cart assembly of claim 17 wherein the upper frame member is generally parallel to the ground in the collapsed position.

21. The cart assembly of claim 12 wherein the lower frame member is positioned beyond the upper frame member to further define a transport arrangement.

22. The cart assembly of claim 21 wherein the second leg assembly has a pair of wheels and wherein a portion of the lower frame member defines a handle that an operator can grasp to transport the cart assembly.

23. The cart assembly of claim 12 wherein the lower frame member is in an elevated position with respect to the first leg assembly to further define a transport arrangement.

24. The cart assembly of claim 23 wherein the second leg assembly has a pair of wheels and a portion of the lower frame member defines a handle that an operator can grasp to transport the cart assembly.

25. A barbecue grill cart assembly comprising:
a barbecue grill assembly having a cooking chamber and a frame assembly;
a cart assembly having an upper frame member, a first leg assembly and a second leg assembly wherein the first and second leg assemblies are pivotally connected to an upper frame member, and wherein at least one of the first or second leg assemblies has a cross member; and,
the cart assembly further having a lower frame member pivotally connected to the other of the first or second leg assemblies, the lower frame member having a securing element that engages an extent of the cross member to secure the cart assembly in an upright position.

26. The barbecue grill cart assembly of claim 25 wherein the lower frame member includes a handle that is manipulated to move the securing element between a secured state and an unsecured state wherein the securing element is disengaged from the cross member.

27. The barbecue grill cart assembly of claim 25 wherein the securing element includes a curvilinear segment that defines a recess cooperatively dimensioned to receive an extent of the cross member.

28. The barbecue grill cart assembly of claim 25 wherein the first and second leg assemblies are in tension when the cart assembly is in the upright position.

29. The barbecue grill cart assembly of claim 25 wherein the securing element is disengaged from the cross member and inserted through the second leg assembly to move the cart assembly between the upright position and a collapsed position.

30. The barbecue grill cart assembly of claim 29 wherein the second leg assembly defines a perimeter and the securing element passes through the perimeter when the cart assembly is moved between the upright position and the collapsed position.

31. The barbecue grill cart assembly of claim 25 wherein the lower frame member is positioned beyond the upper frame member to further define a transport arrangement for transport of the barbecue grill assembly.

32. The barbecue grill cart assembly of claim 31 wherein the lower frame member engages an extent of the upper frame member in the transport arrangement.

33. The barbecue grill cart assembly of claim 25 wherein a first end of the lower frame member is pivotally connected to a lower portion of the first leg assembly, and wherein the securing element is positioned on a second end of the lower frame member.

34. The barbecue grill cart assembly of claim 25 wherein the barbecue grill assembly includes a mounting projection and the upper frame member of the cart assembly includes a receiver cooperatively dimensioned to receive a portion of the mounting projection to releasably secure the grill assembly to the cart assembly.

35. The barbecue grill cart assembly of claim 34 wherein the receiver is defined by a wall extending vertically from upper surface of the upper frame member.

36. The barbecue grill cart assembly of claim 25 wherein the upper frame member is formed from plastic.

37. A cart assembly for use with a barbecue grill assembly comprising:
an upper frame member;
a first leg assembly and a second leg assembly, wherein the leg assemblies are pivotally connected to the upper frame member, and wherein the second leg assembly has a cross member at a lower portion of the leg assembly;

a lower frame member pivotally connected to the first leg assembly, wherein the lower frame member has a securing element; and, wherein the cart assembly is movable between an upright arrangement and a collapsed arrangement, and wherein in the upright arrangement the securing element engages a portion of the cross member.

38. The cart assembly of claim 37 wherein the securing element defines a recess that is dimensioned to receive a portion of the cross member in the erect arrangement.

39. The cart assembly of claim 37 wherein in the erect arrangement, the upper frame member is generally parallel to the ground.

40. The cart assembly of claim 37 wherein in the erect arrangement, the lower frame member is generally parallel to the ground.

41. The cart assembly of claim 37 wherein in the erect arrangement, the cart assembly is adapted to support a barbecue grill assembly.

42. The cart assembly of claim 37 wherein the securing element is disengaged from the cross member and passed through a perimeter of the second leg assembly to move the cart assembly from the erect arrangement to the collapsed arrangement.

43. The cart assembly of claim 37 wherein the first leg assembly is positioned substantially within the perimeter of the second leg assembly in the collapsed position.

44. The cart assembly of claim 43 the first and second leg assemblies are positioned between the upper frame member and the lower frame member in the collapsed arrangement.

45. The cart assembly of claim 44 wherein the upper frame member is generally parallel to the ground in the collapsed position.

46. The cart assembly of claim 37 wherein the lower frame member is positioned beyond the upper frame member to further define a transport arrangement.

47. The cart assembly of claim 46 wherein the second leg assembly has a pair of wheels and wherein a portion of the lower frame member defines a handle that an operator can grasp to transport the cart assembly.

48. The cart assembly of claim 37 wherein the lower frame member is in an elevated position with respect to the first leg assembly to further define a transport arrangement.

49. The cart assembly of claim 48 wherein the second leg assembly has a pair of wheels and a portion of the lower frame member defines a handle that an operator can grasp to transport the cart assembly.

50. The cart assembly of claim 48 wherein the lower frame member engages an extent of the upper frame member in the transport arrangement.

* * * * *